INVENTORS
Rolf Wüthrich
Hans Blatter

United States Patent Office 3,295,049
Patented Dec. 27, 1966

3,295,049
RECTIFIER ARRANGEMENT WITH TRANSDUCTOR COILS FOR VOLTAGE CONTROL AND PROTECTION MEANS AGAINST EXCESS VOLTAGE
Rolf Wüthrich and Hans Blatter, Wettingen, Switzerland, assignors to Aktiengesellschaft Brown, Boveri & Cie, Baden, Switzerland, a joint-stock company
Filed Sept. 10, 1963, Ser. No. 307,915
Claims priority, application Switzerland, Sept. 14, 1962, 10,951/62
3 Claims. (Cl. 321—27)

This invention relates to rectifier circuits using semiconductor diodes for the rectifier elements and is directed to an improved arrangement for 3 phase rectifier circuits of this general type wherein the semiconductor diodes are fed from a 3 phase main and include biased regulating transductor impedance coils for voltage regulation and resistance-condenser (R.C. circuits) for leaking off excess voltages which are caused by the carrier blocking effect.

The regulation of the D.-C. voltage for coarse adjustment in semiconductor systems with uncontrolled elements is generally effected by means of a step switch on the transformer, the secondary voltage being switched over in a step like manner, and for the fine adjustment are used power transductors. These are controlled by biasing, i.e. by pre-magnetization, in such a way that they release, similar to the grid control of rectifiers, the forward direction for the rectifier, starting from a certain point of the cycle, thus varying the modulation of the semiconductor. The biasing is effected by alternating current over a variable regulating winding, which is likewise fed from the main transformer, if the so-called three-coil arrangement is used, otherwise with direct current.

In the three-coil arrangement, both directions of the current can be utilized in each impedance coil, so that only three impedance coils are necessary for six rectifier branches. The impedance coils are then assembled in the branch circuits from the transformer.

Figure 1:
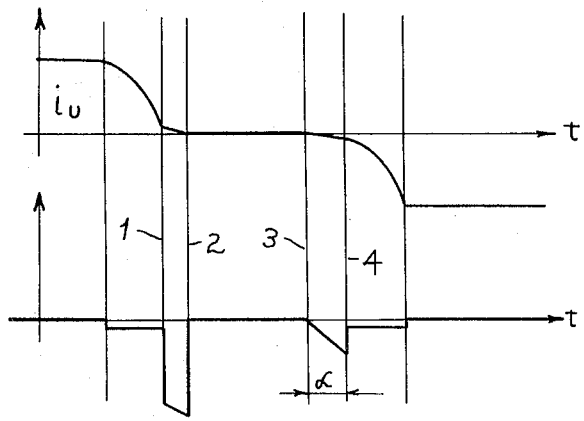
Figure 2:
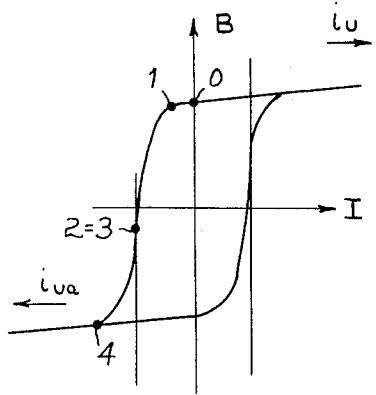
Figure 3:
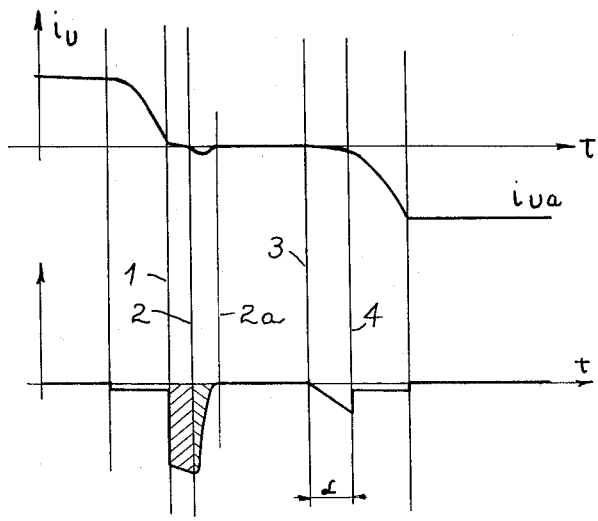
Figure 4:
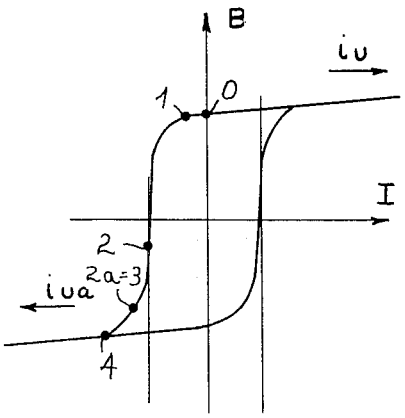

In the accompanying drawings, FIGS. 1, 2, 3 and 4 are graphs depicting the manner in which the impedance coils operate. FIG. 1 shows the current and voltage relationship in a typical coil for one phase while FIG. 2 shows the magnetization curve for the coil. FIGS. 3 and 4 are graphs similar to FIGS. 1 and 2 but under a different condition of operation.

Figure 5:
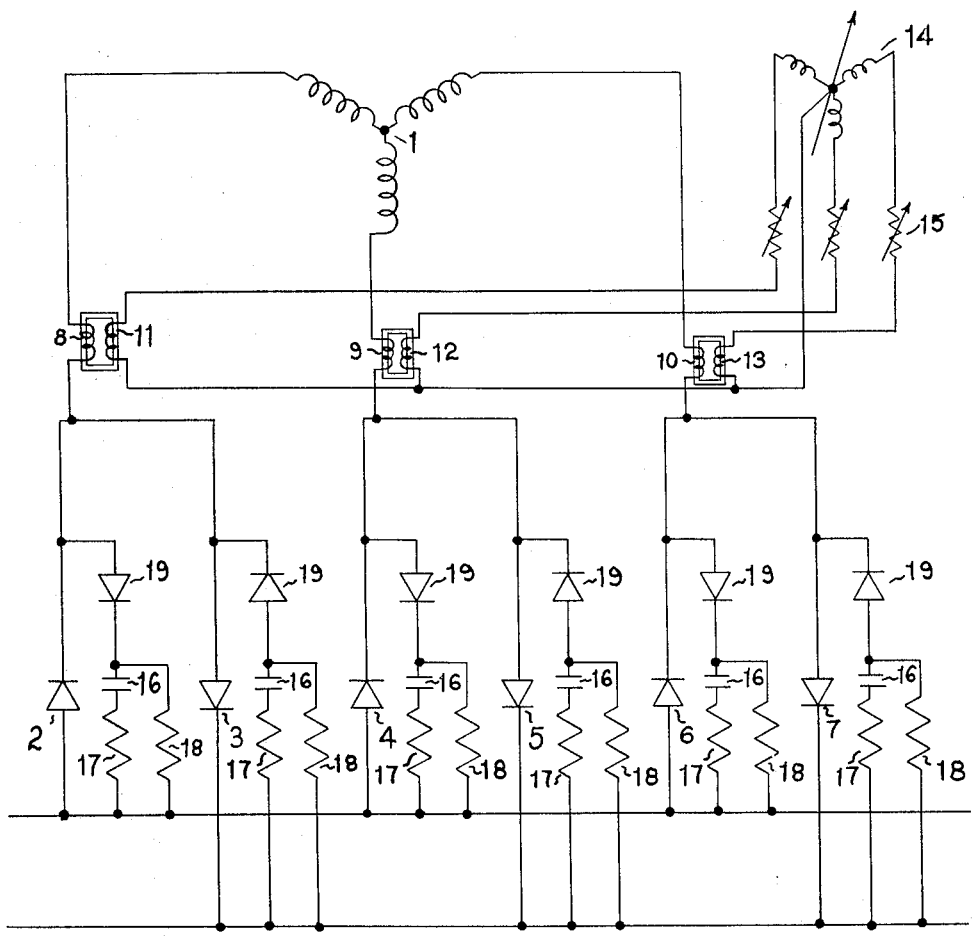

FIG. 5 is a circuit diagram of a rectifier system as improved by the present invention to eliminate disadvantages inherent in prior known systems.

The method of operation of these impedance coils is represented in FIGS. 1 and 2 for the case of the three-coil arrangement. FIG. 1 shows, in the upper part, the path of the current in the transductor coil for one phase. In the lower part is represented the voltage on the impedance coil. FIG. 2 shows the magnetization curve. As long as the transductor coil carries current, the current $i_u$ is flowing. At the point 1 the current extinguishes, with the exception of a remnant which effects the back-magnetization to point 2, the magnetization curve being traversed from 1 to 2. At point 3 the control sets in. Between points 3 and 4 the transductor coil is magnetized in the opposite direction, until it releases the flow of current at point 4. The control angle in this case lies between the points 3 and 4. With full modulation, point 2 would coincide with point 0.

This form of control of the semiconductor as represented can only be ideal, however. It cannot ever be achieved, because condensers are as a rule connected in parallel to the semiconductor element. These condensers are necessary to keep off the excess voltages, caused by the carrier blocking effect, from the semiconductor diodes. When the current is interrupted, a charging current impulse appears in the condensers, following the blocking voltage on the diode. This impulse is closed over the transductor coils in opposite direction to the rectifier current that traversed it before. This results in an additional back-magnetization, which has the disadvantage that the desired regulating range is shortened. This can be seen from FIGS. 3 and 4, which represent the same quantities as in FIGS. 1 and 2. One can see from the bottom curve in FIG. 3 that additional back-magnetization is effected by the condensers between points 2 and 2a. FIG. 4 shows that the further back-magnetization extends from point 2 to 2a. With full modulation, when the control range begins at point 0, this additional back-magnetization would shift the starting point of the control beyond point 1, and only the range from this point to point 4 would be available. Only this range can be used for the control.

Similar is the procedure in D.-C. biasing, that is, with impedance coils which work only in one direction. Here too a loss is caused in the control range by undesired back-magnetization.

In order to eliminate this disadvantage the present invention proposes, in a rectifier-arrangement with biased regulating transductor coils for voltage control using RC members for leaking off excess voltage, the inclusion of an auxiliary diode connected in series with the RC member and a discharge resistance in parallel thereto. The parallel resistance is preferably so selected that the condenser can be discharged within a cycle slightly under the blocking voltage appearing on the rectifier.

With reference now to FIG. 5, 1 designates the secondary winding of the three-phase feed transformer. Each phase leads to a bridge connection of two oppositely poled rectifier diodes 2 and 3, 4 and 5, 6 and 7, respectively. In the feed lines of the phases are arranged the three transductor coils 8, 9, 10. The exciting windings 11, 12 and 13 of these coils are fed with alternating current by the auxiliary transformer 14 over the resistances 15. The winding 14 is regulable so that the amount of current flowing in the windings 11, 12 and 13 can be varied. In this manner the control angle is determined in known manner. Connected in parallel with each of the diodes 2 to 7 are condensers and resistances arranged in RC connection. The condensers are designated by 16, the resistance which is in series with the condenser by 17, and the discharge resistance, which parallels the series connected condenser 16 and resistance 17, is designated by 18. This parallel circuit is in series with a diode 19 which is oppositely poled in relation to the main semiconductor diode 2. The same R.C. arrangement is connected to the other rectifier diodes 3 to 7.

The method of operation is such that the charging current impulse cannot arrive at the transductor because the condenser 16 is still charged to a great extent from the preceding half wave, and the discharge current through the diode 19 is blocked in the direction toward the transductor coil. Back-magnetization of the transductor coils 8 to 10 is thus avoided. The resistance 18 can be so designed that practically no charge is necessary anymore during the passage of the current through the zero point. The time constant of the R.C. circuit which is formed by resistance 18 and condenser 16, is selected so great that the condenser is discharged to only such an extent during the currentless phase that is maintains approximately the value of the blocking voltage.

Protection against excess voltages is nevertheless ensured, because as soon as the voltage at the power diode 2, 3, etc. exceeds the voltage at the condenser, the auxiliary diode 19 becomes conductive and leaks off the excess voltage.

In the six-coil arrangement too, undesired back-magnetization is avoided in a similar manner by the additional diode.

The advantages of the improved arrangement are that undesired back-magnetizations of the transductor coils are avoided, while a good protection against excess voltage and against the carrier stagnation effect are nevertheless maintained.

We claim:

1. A polyphase rectifier system comprising a 3 phase alternating current feed mains, a principal rectifier of the semiconductor element type connected to each phase of said mains for supplying direct current to a load, a regulating transductor impedance coil regulatable for voltage control having biasing means therefor and which is connected between each phase of said mains and the corresponding principal rectifier element, an RC circuit for each of said principal rectifiers, each said RC circuit including a condenser and a first resistance connected in series, an auxiliary rectifier connected in series with said RC circuit, said RC circuit together with said auxiliary rectifier being connected in parallel with said principal rectifier element, said auxiliary rectifier being poled oppositely to the principal rectifier element which it parallels, and a discharge resistance connected in parallel with the series connected condenser and first resistance.

2. A polyphase rectifier system as defined in claim 1 wherein each said discharge resistance has a value such that the condenser correlated thereto can be discharged within one cycle of the alternating current only up to the arising blocking voltage appearing on the principal rectifier element.

3. A polyphase rectifier system as defined in claim 1 wherein each of the three phases to be rectified includes a pair of said principal rectifier elements which are oppositely poled relative to each other, and said rectifier elements of each pair are each provided with an RC circuit and a parallel associated discharge resistance and an auxiliary rectifier.

References Cited by the Examiner

UNITED STATES PATENTS 2,959,724  11/1960  Dortort _____ 321—16
3,229,187  1/1966   Jensen _____ 321—26

JOHN F. COUCH, *Primary Examiner.*

G. GOLDBERG, *Assistant Examiner.*